United States Patent Office 3,460,253
Patented Aug. 12, 1969

3,460,253
SPACING SYSTEM FOR DENTAL PROSTHESES
Henri Cammarata, 2 Rue General Ferrie,
Grenoble, Isere, France
Filed Apr. 13, 1966, Ser. No. 542,283
Claims priority, application France, May 20, 1965,
46,017
Int. Cl. A61c 13/22
U.S. Cl. 32—5                                    5 Claims

ABSTRACT OF THE DISCLOSURE

A spacing arrangement for dental prostheses comprising a male section of a flat oval cross-section with rounded terminal surfaces having a serrated saw tooth outline facing in one direction and a female element provided with a flat oval bore corresponding to the outer outline of the male element and provided with at least one saw tooth facing in a direction opposed to that of first-mentioned serration teeth. One end of the female section receives and is engaged with one end of the male element, whereby the interengaging saw teeth allow adjustable removal of the male element while preventing its re-entry.

---

This invention relates to spacing arrangements for dental prostheses. Some of the usual spacing systems used for dental prostheses are designed mechanically in a manner such that their adjustment is a lengthy and difficult matter, chiefly when said adjustment is to be executed in the patient's mouth, while the permanent spacing systems an expansion produced by one or more compression springs gradually decreases. Further, whatever the type of said prior spacing systems, their cost price is comparatively high and they are not suitable for all purposes.

My invention has for its object to remove such drawbacks and it contemplates a spacing system for a dental prosthesis apparatus which system includes two rectilinear and curvilinear elements of which one is a male element of the flat oval cross-section while the other is a female element with a bore which receives the male element, said two elements being fitted one inside the other while the male element is serrated along each of its rounded outer edges so as to form saw-teeth, the oblique surfaces of which face the female element so as to cooperate with at least one tooth thereon facing in the opposite direction that is away from the male element, which tooth is provided on corresponding sections of the bore formed in the female element. This allows an axial shifting of the male element out of the female element and prevents its reverse movement, said male and female elements being associated each with one of the lobes or blocks forming a dental prosthesis.

Thus the operation for spacing apart the sections of a dental prosthesis equipped with such an arrangement may be executed very speedily and easily since it is sufficient to shift the male element axially out of the female element by one or more notches as required.

With a view to furthering the successive control operations for the spacing of the sections of the dental prosthesis, each of the two elements of my improved arrangement includes, in its flat portion, an opening by which it is possible to insert the corresponding nose of spacing pincers.

Figure 1:
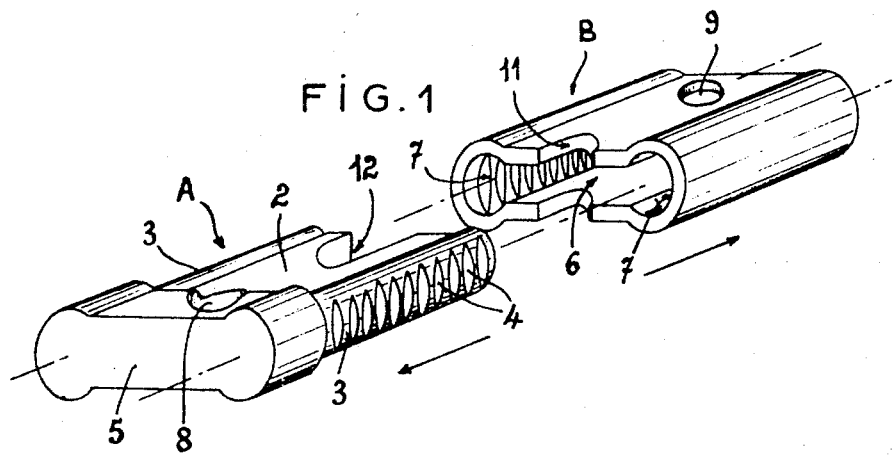
Figure 2:
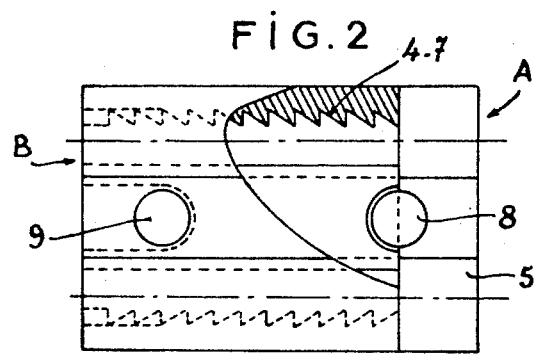
Figure 3:
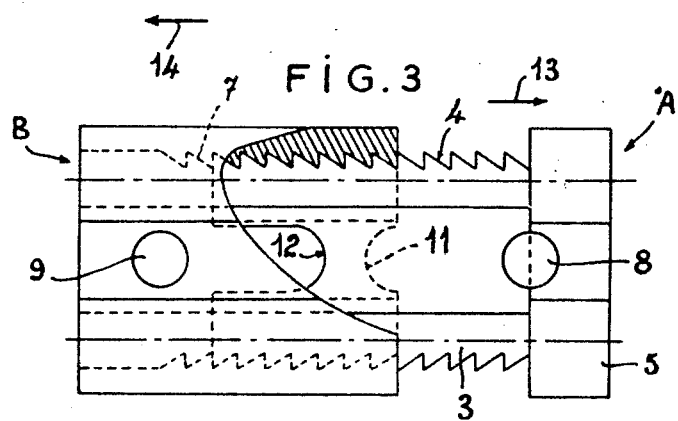
Figure 4:
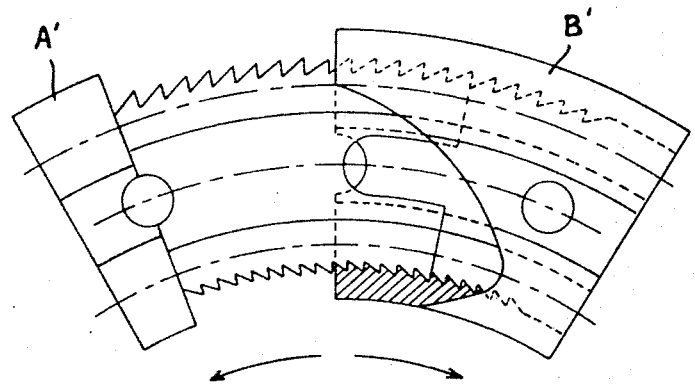
Figure 5:
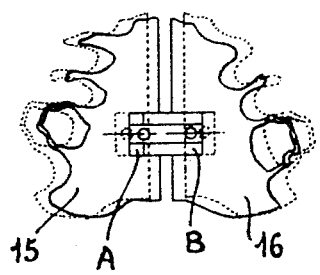
Figure 6:
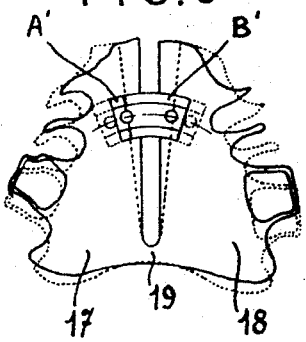
Figure 7:
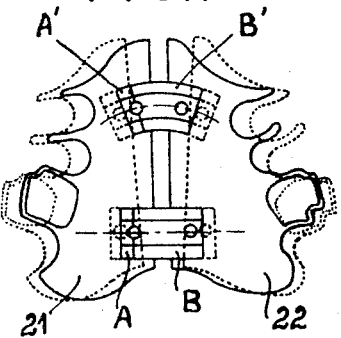

My invention will be readily understood from the following description, reference being made to the accompanying diagrammatic drawing illustrating by way of example and in a non-limiting sense two embodiments of my improved arrangement. In said drawings:

FIG. 1 is an exploded perspective view of a first embodiment of said arrangement, FIGS. 2 and 3 illustrate in plan view and as seen from above the elements illustrated in FIG. 1 when assembled respectively before the spacing operation and after a partial spacing, FIG. 4 is a plan view from above of a modification of said arrangement as seen after a partial spacing, and FIGS. 5, 6 and 7 show three different dental prostheses equipped respectively with the arrangement according to FIGS. 1 to 3, with that according to FIG. 4 and with both arrangements simultaneously.

The spacing arrangement according to my invention includes a male element A and a female element B which are illustrated as separate in FIG. 1. The element A is a solid element of a flat oval cross-section and it includes a central flat section 2 the ends of which are rigid each with a semi-circular section 3.

Each semi-cylindrical section 3 is provided with a serrated saw tooth outline the teeth of which face the end of the male element which is to enter the female element B.

At its end opposed to that provided for its engagement inside the female element B, the male element A carries a head 5 forming an abutment for the latter.

The bore 6 in the female element B has the same cross-section as the male element A and the semi-cylindrical outer sections of said bore are also provided with a serrated saw-tooth outline 7 the teeth of which face a direction opposed to that of the saw teeth 4 of the element A, that is their oblique surfaces face away from the end of the female element engaging the male element; the elements A and B are each provided at the end of their flat central section remote from the cooperating element with a transverse hole shown respectively at 8 and at 9.

In FIG. 2, the elements A and B are illustrated as fitted inside each other, that is with a minimum spacing. In order to allow the holes 8 and 9 to be accessible for said position of minimum spacing, the elements B and A are provided on their rear surface with a notch illustrated respectively at 11 and 12, so as to uncover said holes.

As clearly shown in FIGS. 2 and 3, the outline of the saw teeth 4 and 7 for the elements A and B allows shifting the element A axially in the direction of the arrow 13 or both elements in these two opposed directions simultaneously; but this same outline of the saw teeth prevents any axial shifting of the elements A and B towards each other.

The spacing between the two elements A and B engaging each other, as illustrated in FIG. 3, may be executed by means of special spacing pincers, the noses of which are fitted respectively in the corresponding holes 8 and 9.

It is consequently possible to space the elements A and B as required without it being possible to move them towards each other, which corresponds perfectly to the conditions of use of the arrangement.

However, if it is desired to engage again the male element A further inside the female element B, it is sufficient to fit between the two elements a smooth casing, so as to allow the teeth 4 to slide over the teeth 7.

The arrangement illustrated in FIG. 4 differs from that illustrated in FIGS. 1 to 3 through the fact that their axis instead of being rectilinear is curvilinear for both elements. The operation of said arrangement is obviously the same as that of the precedingly described one.

FIG. 5 shows a dental prosthesis including two blocks 5, 15 and 16 which are interconnected by a spacing arrangement of the type ilustrated in FIGS. 1 to 3, that is including two rectilinear elements A and B.

FIG. 6 shows a further type of dental prosthesis constituted by a single block including two sections 17 and 18 interconnected by an elastic bridging member 19. The spacing arrangement for said prosthesis is of the type including curvilinear elements A′ and B′, as illustrated in FIG. 4.

Lastly, the dental prosthesis apparatus illustrated in FIG. 7 and including two blocks 21 and 22 resorts to two spacing arrangements of which one is constituted by curvilinear elements A' and B' and the other by rectilinear elements A and B.

In FIGURES 5–7 the positions of the dental prosthesis and of the spacing arrangement when the spacing has been executed, are illustrated in dotted lines.

The materials used for the elements A, B, A' and B' are of the conventional neutral materials used for clinical purposes and consistent with acrylates, such as non-oxidizable metals or plastic materials.

What I claim is:

1. A spacing arrangement for dental prostheses comprising male and female members including engageable portions with means enabling adjustable removal of the male member from the female member while preventing insertion of the male member into the female member, said engageable portion of said male member comprising a section of flat oval cross-section with rounded terminal surfaces, said engageable portion of said female member comprising a section with a flat oval bore having an outline corresponding to the outline of said section of the male member, said means which enables adjustable removal of the male member while preventing its insertion comprising an elongated saw tooth portion on at least one of said terminal surfaces of the male member and a corresponding elongated saw tooth portion on the female member engaged with the saw tooth portion of the male member, the saw teeth of said saw tooth portions facing in opposite directions whereby the interengaging saw teeth allow adjustable withdrawal of the male member from the female member while preventing its re-entry.

2. An arrangement as claimed in claim 1, wherein the section of each element has a flat portion with an opening for receiving a tool to adjust the members.

3. An arrangement as claimed in claim 1, wherein said saw tooth portions are both rectilinear or curvilinear.

4. An arrangement as claimed in claim 1 in combination with two prosthesis sections, said arrangement being coupled to and arranged between said prosthesis sections to urge the same apart upon adjustable removal of the male member from the female member.

5. An arrangement as claimed in claim 4 comprising a second arrangement between said prosthesis sections, the members of one arrangement being rectilinear and the members of the second arrangement being curved.

References Cited

UNITED STATES PATENTS

| 1,327,674 | 1/1920 | Hinchey | 32—2 |
| 2,927,578 | 3/1960 | Gerbrands | 32—14 |

FOREIGN PATENTS

| 1,165,755 | 10/1958 | France. |
| 14,914 | 1893 | Great Britain. |
| 405,217 | 2/1934 | Great Britain. |

ROBERT PESHOCK, Primary Examiner